T. J. LAPRATH.
ANIMAL TRAP.
APPLICATION FILED NOV. 6, 1913.
1,146,004.
Patented July 13, 1915.
2 SHEETS—SHEET 2.
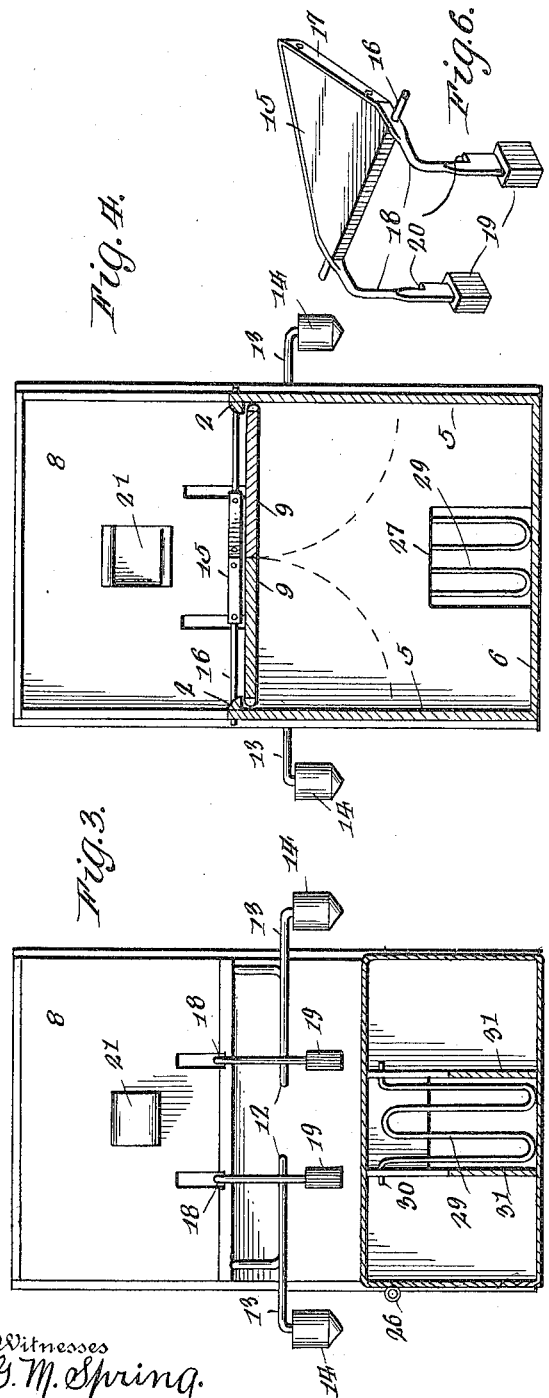
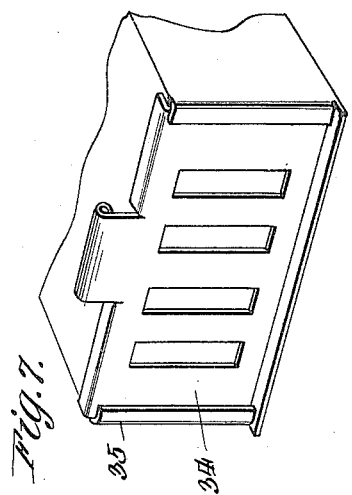
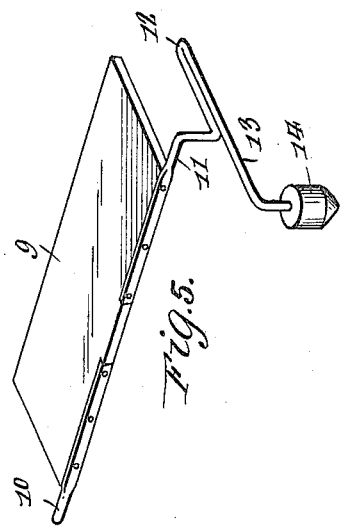
Witnesses
G. M. Spring.
C. H. Crawford
Inventor
Thomas J. Laprath,
By
his Attorney

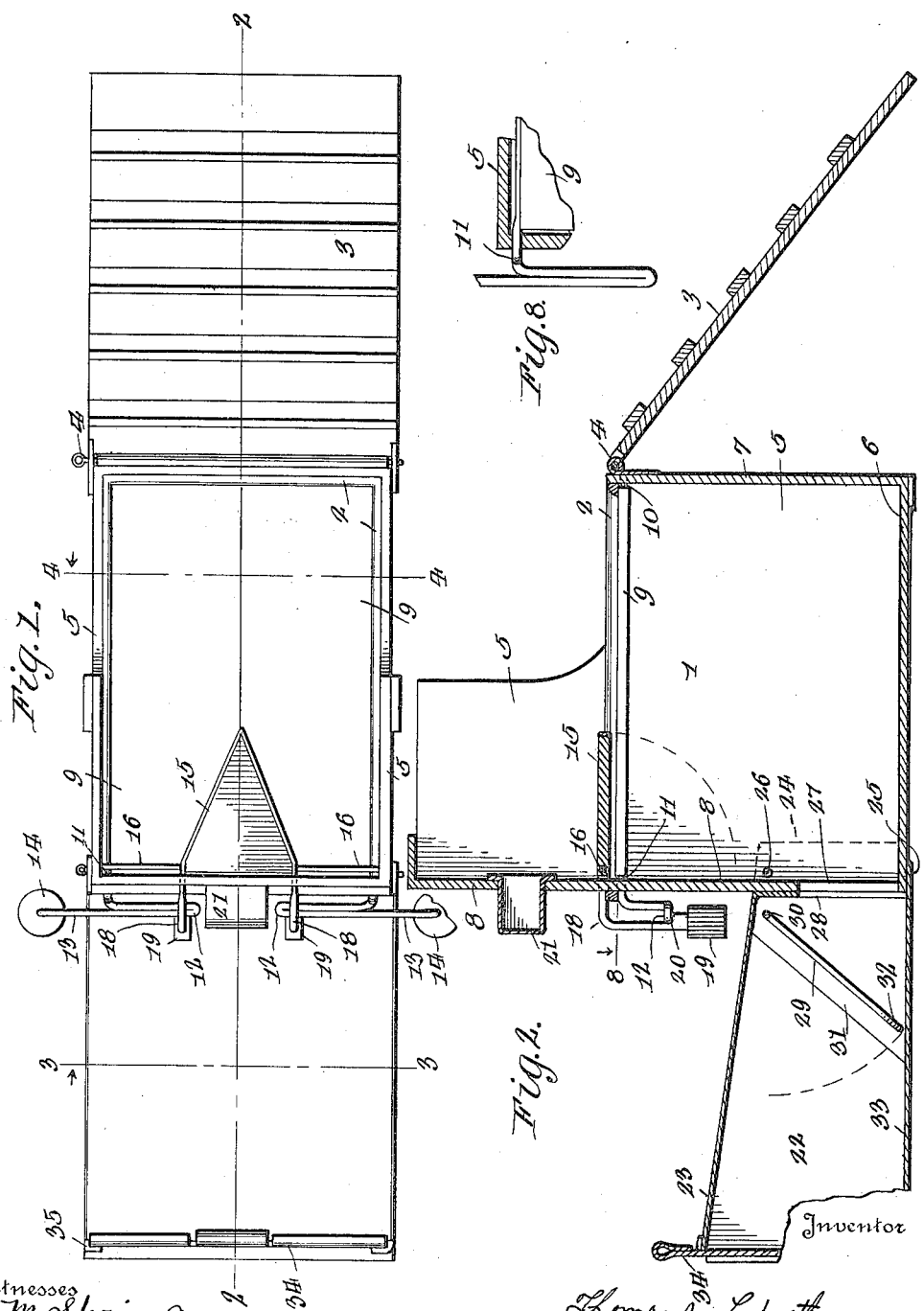

UNITED STATES PATENT OFFICE.

THOMAS J. LAPRATH, OF LYNCH, NEBRASKA.

ANIMAL-TRAP.

1,146,004.   Specification of Letters Patent.   Patented July 13, 1915.

Application filed November 6, 1913. Serial No. 799,602.

*To all whom it may concern:*

Be it known that I, THOMAS J. LAPRATH, a citizen of the United States, residing at Lynch, in the county of Boyd and State of Nebraska, have invented certain new and useful Improvements in Animal-Traps, of which the following is a specification.

This invention has to do with improvements in animal traps and one of the objects is to provide a trap in which a trap-platform is arranged for tread by the animal toward the bait, which latter is disposed adjacent a trigger mechanism for releasing the platform, and causing the animal to descend into a trap chamber.

The invention also relates to an improved form of trigger mechanism including a tread member which is so disposed with respect to a bait that the animal will be attracted toward the tread member in passing toward the bait.

A further object is to provide a trap chamber with one or more trap platforms which are so arranged and disposed that when the animal descends into the trap chamber the trap platforms will be automatically returned to a set position and will be held from movement beyond the set position so as to prevent the animal from jumping out of the trap chamber.

A further object is to provide a captive chamber, in communication with the trap chamber, whereby the trapped animal may find free passage in one direction from the trap chamber to the captive chamber, suitable means being provided for preventing the animal from returning to the trap chamber from the captive chamber.

The device of my invention will be more fully described in connection with the accompanying drawings and will be more particularly pointed out and ascertained in and by the appended claims.

In the drawings:—Figure 1 is a plan view of an animal trap embodying one form of my invention. Fig. 2 is a sectional view on line 2—2 of Fig. 1. Fig. 3 is a sectional view on line 3—3 of Fig. 1. Fig. 4 is a sectional view on line 4—4 of Fig. 1 with the securing rod for the trap chamber omitted. Fig. 5 is a perspective view of one of the trap platforms. Fig. 6 is a perspective view of a portion of the trigger mechanism for releasing the trap platforms and illustrating a tread member connected therewith. Fig. 7 is a perspective view looking from the left of Fig. 1. Fig. 8 is a sectional view on line 8—8 of Fig. 2.

Like characters of reference designate similar parts throughout the different figures of the drawings.

As illustrated, the device of my invention comprises a trap structure embodying a trap chamber 1 having an open upper or top portion provided with means, as shown in the form of cleats 2, for preventing movement of trap platforms in one direction beyond a set position. A cleated approach is shown at 3 for passage of the animal toward the open portion of the chamber 1, and the cleated approach 3 may be hinged at 4, to one wall of the structure which forms the trap chamber 1. I have shown the trap chamber 1 formed by a substantially imperforate inclosure comprising side walls 5, a bottom wall 6, and front and rear walls 7 and 8, respectively. In the present construction, the open top portion of the chamber 1 is normally closed by a pair of trap platforms indicated at 9, and the same are hinged to swing downwardly in the chamber 1 with their longer free edges disposed substantially centrally of the chamber 1, as indicated more particularly in Fig. 4. The cleats 2, which overhang the shorter end margins of the platforms 9, prevent the latter from swinging upwardly beyond their horizontal or set positions. In the construction shown, each longer edge of each platform is provided with a hinge pintle 10 which may extend through a suitable opening in the front wall 7. A hinge pintle 11, for each platform, extends through a suitable opening in the rear wall 8 whereby the platforms 9 are hinged to swing in the manner shown in Fig. 4. The hinge pintles 11 are constructed to form a part of a trip mechanism, and such pintles project inwardly as shown at 12, and outwardly as at 13, the terminal ends being provided with weights 14 for normally holding the platforms in the set position shown in Fig. 4. Thus the inwardly projecting end 12 will be termed the trigger ends or portions of the platform hinge pintles.

The coacting part of the trigger mechanism includes a tread member 15, which is arranged to project over the platforms 9, as will be seen more particularly by reference to Figs. 1 and 2. The tread member 15 is provided with a pintle rod 16 having its ends rotatably mounted in suitable openings in the side walls 5 to hinge the tread member 15 for swinging movement downwardly into the open top of the chamber 1. The tread member 15 is incorporated in the portion of the trigger mechanism, and as shown, I marginally brace the member 15 by a strap 17 through which the pintle rod 16 projects, and the ends of strap 17, are bent at 18 to extend downwardly in a pendant manner along the back wall 8. The terminals of the bent ends 18 are provided with weights 19 and the depending ends are notched as at 20, for engagement with the trigger ends 12, of the platforms 9. When the platforms 9 are set, the ends 12 engage trigger notches 20 and the weights 14 normally hold the platforms 9 in the position shown in Fig. 4 while the weights 19 not only hold the tread member 15 in the position shown in Fig. 2, but they tend to retain the notches 20 in engagement with the trigger ends or portions 12.

I preferably extend the rear wall 8 and the side walls 5, as indicated more particulary in Fig. 2, to form means for inclosing the tread member 15 and preventing access thereto by the animal except by passage of the latter in a direction toward the free end of the tread member 15. Mounted upon the rear wall 8 is a bait holder which may be in the form of a receptacle 21, the disposition of which is such as to attract the animal toward the tread member 15. The upwardly projecting portions 5 also provide guards for preventing the animal from approaching the bait holder 21 except in a direction toward the tread member 15.

The trigger mechanism hereinbefore described will support the weight of the animal upon the platforms 9, and after the fore legs have been disposed upon the platforms 9 and the animal sees that the support is stable, it will gradually approach the bait in the holder 21 so that its hind legs will rest upon the platforms 9. In the efforts of the animal to get at the bait 21, the forelegs will be disposed upon the member 15 thereby causing the same to move freely downwardly toward and into engagement with the platforms 9, a space being provided for this initial movement as illustrated in Fig. 2. This initial free movement of the tread member 15 will be sufficient to disengage the notches 20 from the trigger portion 12 of the platforms 9, thereby causing the latter to open downwardly under the weight of the animal. Immediately upon descent of the animal into the chamber 1 the weights 14 will return the platforms 9 into engagement with the cleats 2 so as to trap the animal in the chamber 1.

When the platforms 9 swing to the lowered position they would not ordinarily swing downwardly a sufficient distance to move the arms 12 entirely out of engagement with the weights 19 and therefore when the platforms return to the set position after the animal has dropped into the trap chamber, the arms would be again engaged by the trigger notches 20. Even if the doors or platforms 9 should swing downwardly beyond the desired amount and the arms 12 cut upon the weighted arms 18 thus preventing the entire closure of the trap chamber the platforms would be positioned at an incline of about forty-five degrees and therefore the trapped animal could not get out of the trap chamber by jumping up upon the platforms. This would be especially true if the platforms were made of metal.

In order to keep the trap chamber 1 free for other animals to be trapped, I provide a captive chamber 22 which may be formed of a sheet metal structure 23. The captive chamber may be provided with flanges 24, overlapping the side walls 5, and a flange 25, overlapping the bottom wall 6, so that said captive chamber can be secured to the trap chamber 1 by a single rod 26. Thus the rod 26 passes through the lateral flanges 24 and the side walls 5 so as to secure the chambers 1 and 22 as shown in Fig. 2. The rear wall 8 is provided with an opening 27 and the captive chamber 22 is provided with an opening 28, for registry with the opening 27, so that an animal can freely pass from chamber 1 to chamber 22. In order to prevent the animal from passing from chamber 22 to chamber 1, I provide non-return means which may be in the form of a gravity acting wire door 29, which is shown hinged at 30 in false walls 31 in the chamber 22. The non-return door 29 is hinged in a manner to cause the lower end 32 to rest upon the lower wall 33, of the chamber 22, when in a closed position. Thus the animal in passing from chamber 1 to 22 will open the door 29, but when the latter descends, the animal will find it impossible to return from chamber 22 to chamber 1. A sliding barred closure 34 may be provided for closing the chamber 22 and may be slidable in guides 35. It will be seen that after an animal is caught in the chamber 22, the latter can be removed from the trap structure by removing the rod 26, and the chamber 23 provides an independent container in which the animal may be transported as desired.

While I have herein shown and described one specific form of my invention, I do not wish to be limited thereto except for such limitations as the claims may import.

I claim:—

1. In an animal trap structure, a trap chamber, a pair of trap platforms extending over said chamber and having pintles hinging said platforms on said structure for swinging movement into said chamber under weight of the animal, a tread member hinged to said structure in overhanging relation with respect to said platforms, the pintles of said platforms and said tread member having trigger mechanism for holding the former in an animal supporting position and releasing the same upon movement of the tread member by the animal, substantially as described.

2. In an animal trap structure a trap chamber, platforms pivotally connected with said trap chamber, the pivot means for said platforms being extended to form trigger mechanisms, a tread member pivotally connected with said trap chamber, and means carried by said tread member for releasably engaging said trigger members.

3. In an animal trap structure a trap chamber, trap platforms, pivot means pivotally connecting said trap platforms with said trap chamber, said pivot means being extended to form triggers, a tread platform, arms extending from said tread platform and provided with means for releasably engaging said triggers, means for yieldably holding said tread platform in a normal position, and means for yieldably holding said trap platform in a normal position.

In testimony whereof I affix my signature in presence of two witnesses.

THOMAS J. LAPRATH.

Witnesses:
C. T. SAMUELSON,
GEO. H. MATHEW.

Copies of this patent may be obtained for five cents each, by addressing the "Commissioner of Patents, Washington, D. C."